J. E. REGAL.
NUT LOCK.
APPLICATION FILED JULY 17, 1916.

1,202,893.

Patented Oct. 31, 1916.

Inventor
J. E. REGAL

By Watson E. Coleman
Attorney

UNITED STATES PATENT OFFICE.

JAMES E. REGAL, OF ELYRIA, OHIO, ASSIGNOR OF ONE-HALF TO CHARLES W. BECKER, OF ELYRIA, OHIO.

NUT-LOCK.

1,202,893.    Specification of Letters Patent.    Patented Oct. 31, 1916.

Application filed July 17, 1916. Serial No. 109,707.

*To all whom it may concern:*

Be it known that I, JAMES E. REGAL, a citizen of the United States, residing at Elyria, in the county of Lorain and State of Ohio, have invented certain new and useful Improvements in Nut-Locks, of which the following is a specification, reference being had to the accompanying drawings.

This invention relates to certain improvements in nut locks and it is an object of the invention to provide novel and improved means whereby a nut, after being applied to a bolt, is effectively held against retrograde movement.

It is also an object of the invention to provide a novel and improved nut lock including two washers adapted to be imposed one upon the other and each provided with means for biting within the threads of the bolt and wherein said washers are provided with coacting means operable under the influence of the nut when applied to the bolt for causing the washers to bite the threads of the bolt.

The invention consists in the details of construction and in the combination and arrangement of the several parts of my improved nut lock whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1:
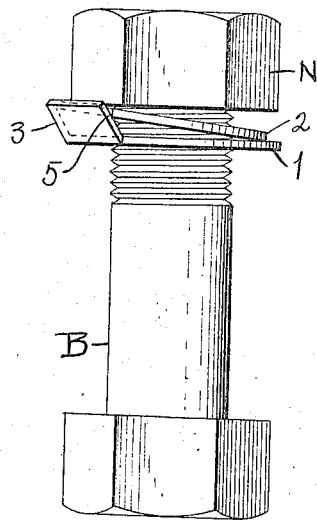
Figure 2:
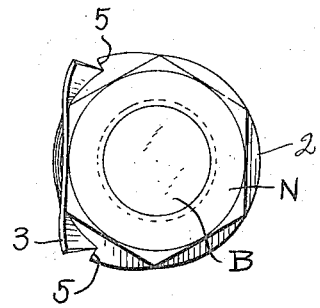
Figure 3:
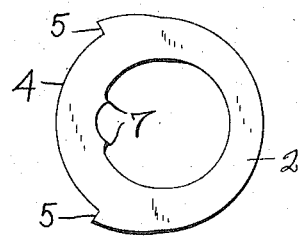
Figure 5:
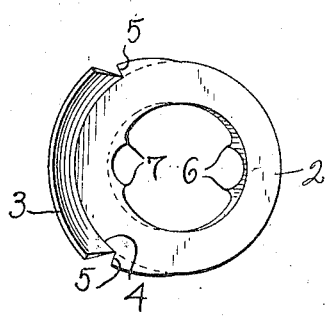
Figure 4:
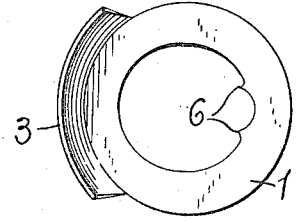

Figure 1 is an elevational view illustrating a nut lock constructed in accordance with an embodiment of my invention and showing the nut being initially applied; Fig. 2 is a view in end elevation showing my improved nut lock in operative assemblage; Fig. 3 is a view in top plan of one of the washers as herein employed; Fig. 4 is a view in top plan of a second washer herein embodied; and Fig. 5 is a view in top plan showing both of the washers in their initial imposed relation.

As disclosed in the accompanying drawings, B denotes a bolt of conventional form with which is adapted to coact the nut N.

My improved nut lock as herein set forth comprises the washers 1 and 2 adapted to embrace the bolt B and to be interposed between the nut N and the work. The washer 1 is provided with the upstanding marginal flange 3 disposed on a predetermined angle relative to the washer 1, said angle being less than an angle of 90°, and the second washer 2 is provided with a peripheral recess 4 through which the flange 3 is adapted to extend when the washers are in imposed relation and operatively engaged with the bolt B. It will be perceived that the shoulders 5 afforded at the ends of the recess 4 are adapted to engage the ends of the flange 3 whereby the washers 1 and 2 are maintained against rotation one independently of the other.

The bore of the washer 1 diametrically opposed to the flange 3 is provided with the inwardly directed teeth 6, while the washer 2 in the side of its bore adjacent the recess 4 is provided with similar teeth 7.

When the washers are initially applied upon a bolt the recessed marginal portion of the washer 2 rests upon the flange 3, whereby it will be perceived that as the nut N is tightened the washer 2 will be moved in such a direction as to cause the teeth 6 thereof to bite within the threads, while the action of the nut N by contact with the flange 3 will cause the washer 1 to move in such a direction as to have the teeth 6 thereof bite within the bolt. After the nut N has been properly adjusted upon the bolt B, the flange 3 is then forced upwardly, through the medium of a hammer or other implement, to contact with a side face of the nut N whereby a side lock is afforded for the nut which will effectively hold the same against movement around the bolt.

From the foregoing description, it is thought to be obvious that a nut lock constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A nut lock comprising two washers, one of said washers having an upstanding marginal flange disposed on a predetermined angle, the second washer being provided with a peripheral recess to receive said flange, said washers being provided with diametrically opposed and inwardly directed biting teeth.

2. A nut lock comprising two washers, one of said washers having an upstanding marginal flange disposed on a predetermined angle, the second washer being provided with a peripheral recess to receive said flange, the washer provided with the flange being provided with an inwardly directed biting tooth diametrically opposed to the flange and the second washer being provided with an inwardly disposed biting tooth positioned adjacent the marginal recess thereof.

3. A nut lock comprising two washers, one of said washers having an upstanding marginal flange disposed on a predetermined angle, the second washer being provided with a peripheral recess to receive said flange, said washers being provided with diametrically opposed and inwardly directed biting teeth, said flange being bendable.

In testimony whereof I hereunto affix my signature in the presence of two witnesses.

JAMES E. REGAL.

Witnesses:
M. J. McGuire,
John Aschenback.